US012761038B2

(12) United States Patent
Ryu

(10) Patent No.: US 12,761,038 B2
(45) Date of Patent: Oct. 13, 2026

(54) VEHICLE TRAFFIC LIGHT INFORMATION DISPLAY APPARATUS AND METHOD

(71) Applicants: Hyundai Motor Company, Seoul (KR); Kia Corporation, Seoul (KR)

(72) Inventor: Min Ah Ryu, Suwon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 274 days.

(21) Appl. No.: 17/942,583

(22) Filed: Sep. 12, 2022

(65) Prior Publication Data

US 2023/0228589 A1 Jul. 20, 2023

(30) Foreign Application Priority Data

Jan. 19, 2022 (KR) ........................ 10-2022-0007934

(51) Int. Cl.

| | |
|---|---|
| ***G01C 21/36*** | (2006.01) |
| ***B60K 35/10*** | (2024.01) |
| ***B60K 35/215*** | (2024.01) |
| ***B60K 35/23*** | (2024.01) |
| ***B60K 35/28*** | (2024.01) |
| ***B60K 35/60*** | (2024.01) |
| ***G06V 20/58*** | (2022.01) |

(52) U.S. Cl.

CPC .......... *G01C 21/3697* (2013.01); *B60K 35/10* (2024.01); *B60K 35/23* (2024.01); *B60K 35/28* (2024.01); *B60K 35/60* (2024.01); *G01C 21/365* (2013.01); *G06V 20/584* (2022.01); *B60K 35/215* (2024.01); *B60K 2360/166* (2024.01)

(58) Field of Classification Search

CPC .............. G01C 21/3697; G01C 21/365; G06V 20/584; G06V 20/588; B60K 35/00; B60K 35/28; B60K 2360/166; B60K 2360/178; B60K 35/265; B60W 50/14; B60W 30/181; B60W 40/02; B60W 2050/143; B60W 2050/146; B60W 2520/04; B60W 2520/06; B60W 2555/60; B60W 2556/50

See application file for complete search history.

(56) References Cited

U.S. PATENT DOCUMENTS

2016/0284215 A1* 9/2016 Ova ..................... G06V 20/584
2019/0276022 A1* 9/2019 Bae ........................ B60W 10/04
2020/0005636 A1* 1/2020 Haltakov ............... B60K 35/25

(Continued)

*Primary Examiner* — Anne Marie Antonucci
*Assistant Examiner* — Patrick M Brady
(74) *Attorney, Agent, or Firm* — Fox Rothschild LLP

(57) ABSTRACT

A vehicle traffic light information display apparatus includes a communication device that receives at least one of a vehicle surrounding image, vehicle location information, lane driving direction information, turn indicator status information, a navigation guidance route, or any combination thereof, a driving direction determiner that determines a driving direction of a vehicle based on at least one of the vehicle surrounding image, the vehicle location information, the lane driving direction information, the turn indicator status information, or any combination thereof, and a traffic light indication information generator that recognizes a traffic light around the vehicle based on the vehicle surrounding image and generates traffic light indication information based on at least one of the recognized traffic light, the driving direction, the navigation guidance route, or any combination thereof.

18 Claims, 8 Drawing Sheets

(56) References Cited

U.S. PATENT DOCUMENTS

| | | | | |
|---|---|---|---|---|
| 2020/0265250 | A1* | 8/2020 | Oe | G08G 1/09623 |
| 2022/0073106 | A1* | 3/2022 | Ahn | G08G 1/097 |
| 2022/0189300 | A1* | 6/2022 | Yu | G08G 1/096888 |

* cited by examiner

VEHICLE TRAFFIC LIGHT INFORMATION DISPLAY APPARATUS AND METHOD

CROSS-REFERENCE TO RELATED APPLICATION

This application is based on and claims under 35 U.S.C. § 119(a) the benefit of Korean Patent Application No. 10-2022-0007934, filed in the Korean Intellectual Property Office on Jan. 19, 2022, the entire contents of which are incorporated herein by reference.

TECHNICAL FIELD

Embodiments of the present disclosure relate to a vehicle traffic light information display apparatus and method.

DESCRIPTION OF RELATED ART

In general, a vehicle needs to drive or stop in obedience to signals of a traffic light, but a driver may suffer difficulty in finding out a traffic light to be observed.

For example, when there are multiple traffic lights around a vehicle at an intersection such as a crossroad or a five-way intersection, the driver may suffer difficulty or be distracted while figuring out which traffic lights to be observed.

As another example, when it is difficult for the driver to look ahead, such as when sunlight is illuminating the driver's eyes, the driver may have difficulty recognizing traffic lights around the vehicle.

Further, even though the traffic lights to be observed are identified, it may be difficult to ascertain whether the vehicle is currently located in a correct lane when directions in which the vehicle is capable of driving in lanes are limited.

In addition, in general, a driver of a vehicle that is stopped according to a stop signal of a traffic light needs to carefully watch the traffic light until the traffic light is changed to a progress signal, thereby increasing the driver's fatigue.

SUMMARY

Embodiments of the present disclosure have been made to solve the above-mentioned problems occurring in the prior art while advantages achieved by the prior art are maintained intact.

An embodiment of the present disclosure provides a vehicle traffic light information display apparatus and method for determining a driving direction of a vehicle based on at least one of a vehicle surrounding image, vehicle location information, lane driving direction information, turn indicator status information, or any combination thereof, recognizing a traffic light around the vehicle based on the vehicle surrounding image and generating traffic light indication information based on at least one of the recognized traffic light, the driving direction, the navigation guidance route, or any combination thereof.

An embodiment of the present disclosure provides a vehicle traffic light information display apparatus and method for generating traffic light indication information when a driving direction matches a direction of a navigation guidance route.

Still another embodiment of the present disclosure provides a vehicle traffic light information display apparatus and method for transmitting traffic light indication information to one or more of a vehicle navigation monitor, a HUD, a cluster, or an audio output device.

Still another embodiment of the present disclosure provides a vehicle traffic light information display apparatus and method for generating portable device traffic light indication information when a driving direction matches a direction of a portable device guidance route.

Still another embodiment of the present disclosure provides a vehicle traffic light information display apparatus and method for transmitting portable device traffic light indication information to one or more of a HUD, a cluster, or an audio output device, and transmitting the traffic light indication information to a navigation monitor of a vehicle.

Still another embodiment of the present disclosure provides a vehicle traffic light information display apparatus and method for generating vehicle departure notification information in response to a traffic light being changed to a progress signal when a vehicle is stopped and transmitting the vehicle departure notification information to one or more of a vehicle navigation monitor, an HUD, a cluster, or an audio output device.

The technical problems to be solved by the present inventive concept are not limited to the aforementioned problems, and any other technical problems not mentioned herein will be clearly understood from the following description by those skilled in the art to which embodiments of the present disclosure pertain.

The technical problems to be solved by embodiments of the present disclosure are not limited to the aforementioned problems, and any other technical problems not mentioned herein will be clearly understood from the following description by those skilled in the art to which embodiments of the present disclosure pertain.

According to an embodiment of the present disclosure, a vehicle traffic light information display apparatus includes a communication device that receives at least one of a vehicle surrounding image, vehicle location information, lane driving direction information, turn indicator status information, a navigation guidance route, or any combination thereof, a driving direction determiner that determines a driving direction of a vehicle based on at least one of the vehicle surrounding image, the vehicle location information, the lane driving direction information, the turn indicator status information, or any combination thereof, and a traffic light indication information generator that recognizes a traffic light around the vehicle based on the vehicle surrounding image and generates traffic light indication information based on at least one of the recognized traffic light, the driving direction, the navigation guidance route, or any combination thereof.

According to an exemplary embodiment, the traffic light indication information generator may generate the traffic light indication information for a traffic light corresponding to the navigation guidance route among the recognized traffic lights, when the driving direction matches the direction of the navigation guidance route.

According to an exemplary embodiment, the communication device may transmit the generated traffic light indication information to one or more of a navigation monitor of the vehicle, a head-up display (HUD), a cluster, or an audio output device.

According to an exemplary embodiment, the communication device may further receive a portable device guidance route, and the traffic light indication information generator may generate portable device traffic light indication information for a traffic light corresponding to the portable device guidance route among the recognized traffic lights when the driving direction does not match the direction of the navigation guidance route and matches a direction of the portable device guidance route.

According to an exemplary embodiment, the communication device may transmit the generated portable device traffic light indication information to one or more of a HUD, a cluster, an audio output device, or a portable device, and transmit the generated traffic light indication information to a navigation monitor of the vehicle.

According to an exemplary embodiment, the driving direction determiner may again determine the driving direction, and the traffic light indication information generator may again recognize traffic lights around the vehicle, when the driving direction does not match both the direction of the navigation guidance route and the direction of the portable device guidance route.

According to an exemplary embodiment, the driving direction determiner may again determine the driving direction, and the traffic light indication information generator may again recognize traffic lights around the vehicle, when the vehicle is driving in a state in which the traffic light indication information or the portable device traffic light indication information is generated.

According to an exemplary embodiment, the traffic light indication information generator may again generate the traffic light indication information in response to a traffic light corresponding to the navigation guidance route being a stop signal for the navigation guidance route or again generate portable device traffic light indication information in response to a traffic light corresponding to a portable device guidance route being a stop signal for the portable device guidance route, when the vehicle is stopped while the traffic light indication information is generated.

According to an exemplary embodiment, the vehicle traffic light information display apparatus may further include a notification information generator configured to generate vehicle departure notification information in response to a traffic light corresponding to the navigation guidance route being changed to a progress signal for the navigation guidance route, when the vehicle is stopped while the traffic light indication information is generated, and the communication device may transmit the vehicle departure notification information to one or more of a navigation monitor of the vehicle, a head-up display (HUD), a cluster, or an audio output device.

According to an exemplary embodiment, the vehicle traffic light information display apparatus may further include a notification information generator configured to generate vehicle departure notification information in response to a traffic light corresponding to the portable device guidance route being changed to a progress signal for the portable device guidance route, when the vehicle is stopped while the traffic light indication information is generated, and the communication device may transmit the vehicle departure notification information to one or more of a HUD, a cluster, an audio output device, or a portable device.

According to an embodiment of the present disclosure, a vehicle traffic light information display method may include receiving, by a communication device, at least one of a vehicle surrounding image, vehicle location information, lane driving direction information, turn indicator status information, a navigation guidance route, or any combination thereof, determining, by a driving direction determiner, a driving direction of a vehicle based on at least one of the vehicle surrounding image, the vehicle location information, the lane driving direction information, the turn indicator status information, or any combination thereof, recognizing, by a traffic light indication information generator, traffic lights around the vehicle based on the vehicle surrounding image, and generating, by the traffic light indication information generator, traffic light indication information based on at least one of the recognized traffic light, the driving direction, the navigation guidance route, or any combination thereof.

According to an exemplary embodiment, the generating of the traffic light indication information may include generating, by the traffic light indication information generator, the traffic light indication information for a traffic light corresponding to the navigation guidance route among the recognized traffic lights when the driving direction matches the direction of the navigation guidance route.

According to an exemplary embodiment, the vehicle traffic light information display method may further include transmitting, by a communication device, the generated traffic light indication information to one or more of a navigation monitor of the vehicle, a HUD, a cluster, or an audio output device.

According to an exemplary embodiment, the vehicle traffic light information display method may include receiving, by the communication device a portable device guidance route, and the generating of the traffic light indication information may include generating, by the traffic light indication information generator, portable device traffic light indication information for a traffic light corresponding to a portable device guidance route among the recognized traffic lights when the driving direction does not match the direction of the navigation guidance route and matches a direction of the portable device guidance route.

According to an exemplary embodiment, the vehicle traffic light information display method may further include transmitting, by the communication device, the generated portable device traffic light indication information to one or more of a HUD, a cluster, an audio output device, or a portable device and transmitting, by the communication device, the generated traffic light indication information to a navigation monitor of the vehicle.

According to an exemplary embodiment, the vehicle traffic light information display method may further include, again determining, by the driving direction determiner, the driving direction when the driving direction does not match both the direction of the navigation guidance route and the direction of the portable device guidance route, and again recognizing, by the traffic light indication information generator, traffic lights around the vehicle when the driving direction does not match both the direction of the navigation guidance route and the direction of the portable device guidance route.

According to an exemplary embodiment, the vehicle traffic light information display method may further comprising: again determining, by the driving direction determiner, the driving direction when the vehicle is driving in a state in which the traffic light indication information or portable device traffic light indication information is generated, and again recognizing, by the traffic light indication information generator, traffic lights around the vehicle when the vehicle is driving in the state in which the traffic light indication information or portable device traffic light indication information is generated.

According to an exemplary embodiment, the vehicle traffic light information display method may further include again generating, by the traffic light indication information generator, the traffic light indication information in response to a traffic light corresponding to the navigation guidance route being a stop signal for the navigation guidance route or again generating, by the traffic light indication information generator, portable device traffic light indication information in response to a traffic light corresponding to a portable device guidance route being a stop signal for the portable device guidance route when the vehicle is stopped while the traffic light indication information is generated.

According to an exemplary embodiment, the vehicle traffic light information display method may further comprising: generating, by a notification information generator, vehicle departure notification information in response to a traffic light corresponding to the navigation guidance route being changed to a progress signal for the navigation guidance route when the vehicle is stopped while the traffic light indication information is generated, and transmitting, by the communication device, the vehicle departure notification information to one or more of a navigation monitor, a HUD, a cluster, or an audio output device of the vehicle.

According to an exemplary embodiment, the vehicle traffic light information display method may further include, generating, by a notification information generator, vehicle departure notification information in response to a traffic light corresponding to the portable device guidance route being changed to a progress signal for the portable device guidance route when the vehicle is stopped while the portable device traffic light indication information is generated, and transmitting, by the communication device, the vehicle departure notification information to one or more of a HUD, a cluster, an audio output device, or a portable device.

As discussed, the method and system suitably include use of a controller or processer.

In another aspect, vehicles are provided that comprise an apparatus as disclosed herein.

BRIEF DESCRIPTION OF THE DRAWINGS

The above and other objects, features and advantages of embodiments of the present disclosure will be more apparent from the following detailed description taken in conjunction with the accompanying drawings.

DETAILED DESCRIPTION

Figure 1:
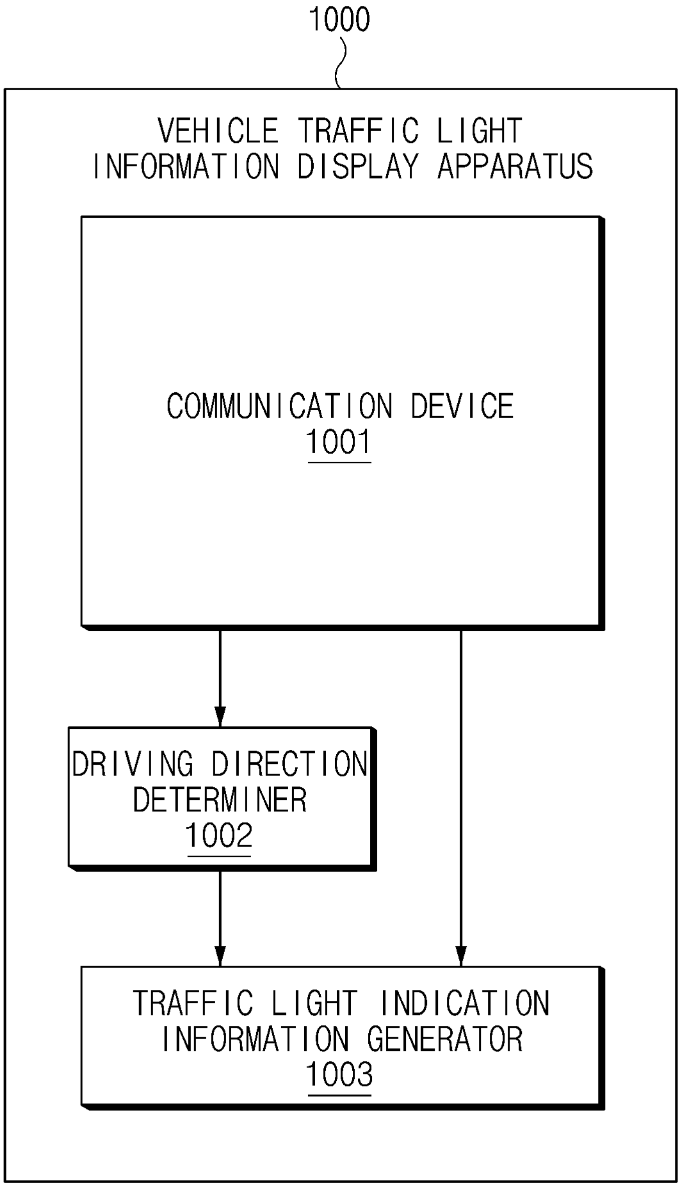
FIG. 1 is a diagram illustrating a vehicle traffic light information display apparatus according to an exemplary embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, “A”, “B”, (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which embodiments of the present disclosure pertain. Such terms as those defined in a generally used dictionary are to be interpreted as having meanings equal to the contextual meanings in the relevant field of art and are not to be interpreted as having ideal or excessively formal meanings unless clearly defined as having such in the present application.

It is understood that the term “vehicle” or “vehicular” or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms “a,” “an” and “the” are intended to include the plural forms as well, unless the context clearly indicates otherwise. These terms are merely intended to distinguish one component from another component, and the terms do not limit the nature, sequence or order of the constituent components. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. Throughout the specification, unless explicitly described to the contrary, the word “comprise” and variations such as “comprises” or “comprising” will be understood to imply the inclusion of stated elements but not the exclusion of any other elements. In addition, the terms “unit”, “-er”, “-or”, and “module” described in the specification mean units for processing at least one function and operation and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to FIGS. 1 to 7.

FIG. 1 is a diagram illustrating a vehicle traffic light information display apparatus 1000 according to an exemplary embodiment of the present disclosure.

The vehicle traffic light information display apparatus 1000 according to an exemplary embodiment of the present disclosure may include a communication device 1001, a driving direction determiner 1002, and a traffic light indication information generator 1003.

Also, the vehicle traffic light information display apparatus 1000 according to the embodiment may include one or more elements not shown in FIG. 1.

The vehicle traffic light information display apparatus 1000 may be included inside or outside the vehicle.

The communication device 1001 may receive one or more of a vehicle surrounding image, vehicle location information, lane driving direction information, turn indicator status information, a navigation guidance route, or any combination thereof.

Here, the communication device 1001 may use a communication scheme such as a LIN (Local Interconnect Network), CAN (Controller Area Network), FlexRay Communication Bus, MOST (Media Oriented Systems Transport), DSRC (Dedicated Short Range Communication), C-V2X (Cellular Vehicle-to-Everything), Wi-Fi, WiBro (Wireless Broadband), or WiMax (Worldwide Interoperability for Microwave Access) or the like but is not limited thereto.

The communication device 1001 may acquire a vehicle surrounding image captured through an image acquisition means such as a camera provided in the vehicle but means for acquiring the vehicle surrounding image is not limited to the camera provided in the vehicle.

The communication device 1001 may receive one or more of vehicle location information, lane driving direction information, or navigation guidance route from a navigation device provided in the vehicle or a portable device, but the means through which the communication device 1001 acquires the vehicle location information or the lane driving direction information is not limited to a navigation device or a portable device.

The portable device may communicate with the vehicle or the vehicle traffic light information display apparatus 1000 and may include a portable device of a passenger including a driver.

The lane driving direction information may include directions in which driving is permitted or prohibited, such as left turn, straight, straight and left turn, left turn and straight prohibited, straight and left turn prohibited, right turn, straight and right turn, right turn and straight prohibited, straight and right turn prohibited, unprotected left turn, U-turn or one-way driving, but is not limited to.

The communication device 1001 may receive the status information of the turn indicator lamp of the vehicle from the steering wheel or the turn indicator lamp. The turn indicator status information may include information on which of turn indicators of the vehicle is turned on or which of the turn indicators is turned off. For example, when the driver turns on the left turn indicator of the vehicle, the turn indicator status information may be information indicating that the left turn indicator of the vehicle is turned on.

The turn indicator status information may include the status information of the turn indicator corresponding to the intention of a driver even when the turn indicator is not actually turned on despite the driver's operation of turning on the turn indicator due to reason such as the vehicle's turn indicator bulb being damaged.

The communication device 1001 may transmit one or more of a vehicle surrounding image, location information, lane driving direction information, or turn indicator status information to the driving direction determiner 1002 and may transmit one or more of a vehicle surrounding image or a navigation guidance route to the traffic light indication information generator 1003.

The vehicle traffic light information display apparatus 1000 may include the driving direction determiner 1002.

The driving direction determiner 1002 may receive one or more of a vehicle surrounding image, vehicle location information, lane driving direction information, or turn indicator status information from the communication device 1001.

The driving direction determiner 1002 may determine a driving direction of the vehicle based on one or more of the vehicle surrounding image, the vehicle location information, the lane driving direction information, or the turn indicator status information.

The driving direction of the vehicle may include, but is not limited to, a direction of a lane in which the vehicle is to drive in a straight line, a left turn, a right turn, a U-turn, or an intersection in which multiple lanes exist.

Specifically, the driving direction determiner 1002 may determine the driving direction of the vehicle based on a road painted traffic sign included in a vehicle surrounding image. For example, the driving direction determiner 1002 may determine that the driving direction of the vehicle is a left turn based on the fact that the vehicle is positioned in a left turn lane through the vehicle surrounding image.

Specifically, the driving direction determiner 1002 may determine the driving direction of the vehicle based on the vehicle location information and the lane driving direction information. For example, the driving direction determiner 1002 may determine the driving direction of the vehicle by figuring out which road and which lane of the road the vehicle is currently located based on the vehicle location information and the lane driving direction information.

Specifically, the driving direction determiner 1002 may determine the driving direction of the vehicle based on the turn indicator status information. For example, the driving direction determiner 1002 may determine that the driving direction of the vehicle is a left turn based on the turn indicator status information indicating that a left turn indicator is currently turned on.

The driving direction determiner 1002 may transmit the driving direction of the vehicle determined by the driving direction determiner 1002 to the traffic light indication information generator 1003.

In addition, the vehicle traffic light information display apparatus 1000 may include the traffic light indication information generator 1003.

The traffic light indication information generator 1003 may receive one or more of a vehicle surrounding image and a navigation guidance route from the communication device 1001 and receive the driving direction of the vehicle determined by the driving direction determiner 1002 from the driving direction determiner 1002.

The traffic light indication information generator 1003 may recognize traffic lights around the vehicle based on the vehicle surrounding image and generate traffic light indication information based on one or more of the recognized traffic light, the driving direction or the navigation guidance route.

For example, the traffic light indication information generator 1003 may recognize traffic lights around the vehicle based on the vehicle surrounding image.

In addition, when the driving direction matches the navigation guidance route, the traffic light indication information generator 1003 may generate traffic light indication information for a traffic light corresponding to the navigation guidance route among the recognized traffic lights.

Details of the traffic light indication information generator 1003 that generates the traffic light indication information will be described in detail with reference to FIGS. 3 to 4.

The communication device 1001 may transmit the generated traffic light indication information to one or more of a navigation monitor, a head-up display (HUD), a cluster, or an audio output device of a vehicle.

Figure 2A:
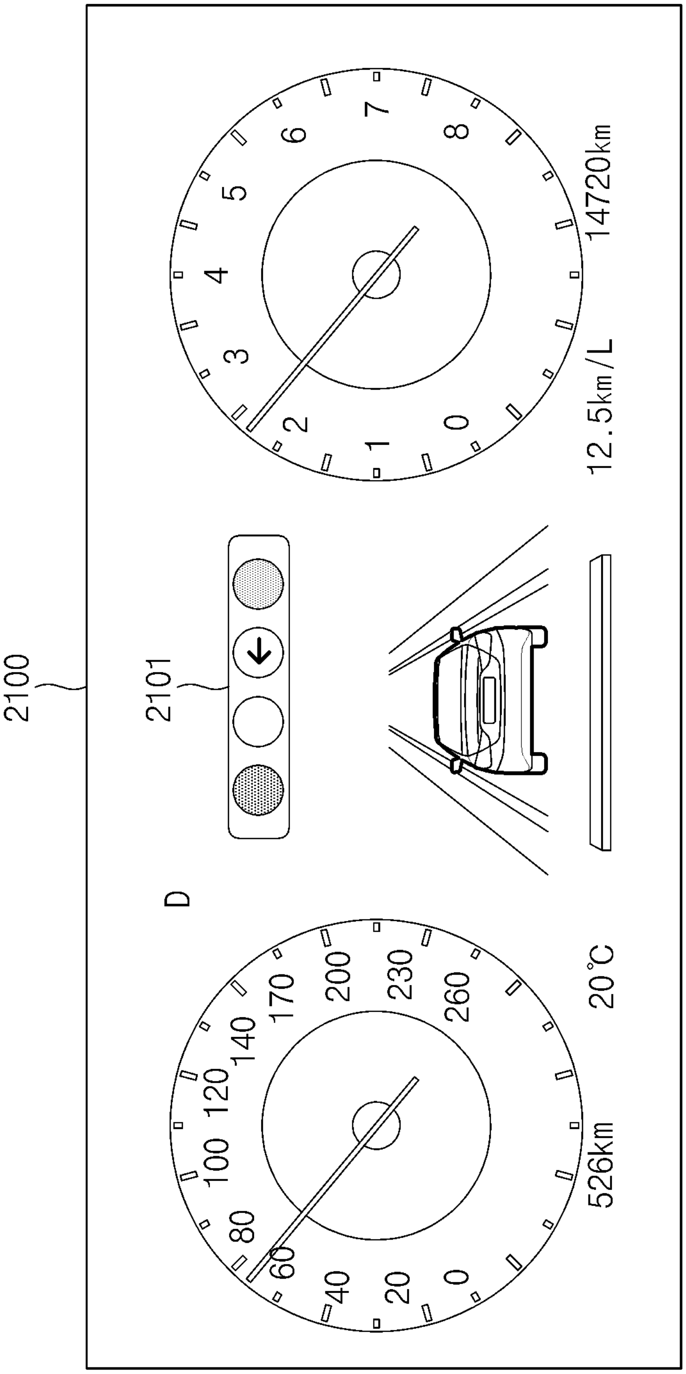
FIGS. 2A and 2B are diagrams illustrating examples in which traffic light indication information or portable device traffic light indication information is displayed according to another embodiment.
Figure 2B:
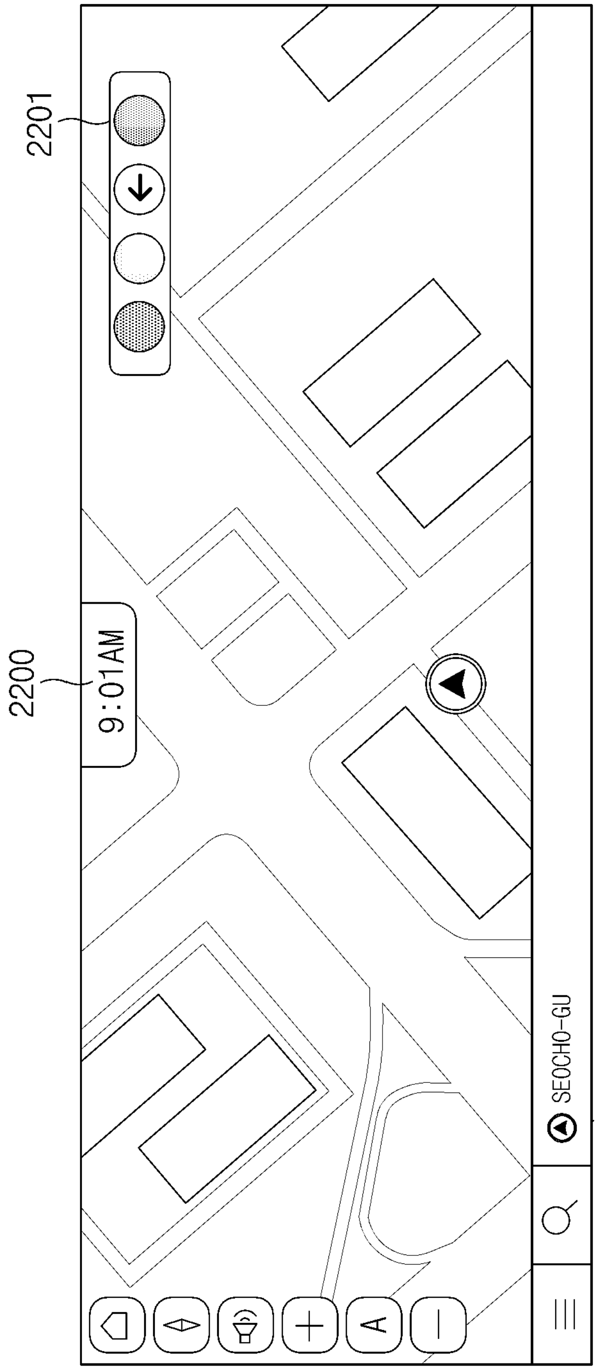

FIGS. 2A and 2B are diagrams illustrating examples in which traffic light indication information 2101 or 2201 or portable device traffic light indication information 2101 is displayed according to another embodiment.

FIG. 2A is a diagram illustrating an example in which traffic light indication information or portable device traffic light indication information 2101 is displayed on a cluster 2100 of a vehicle.

The cluster 2100 may be provided in a vehicle including a vehicle traffic light information display device (e.g., 1000 in FIG. 1).

The shape and number of speed instrument panels constituting the cluster 2100 of FIG. 2A, and the display of temperature, gear engagement state, and vehicle shape may be one of examples for helping the understanding of the embodiment.

The traffic light indication information 2101 generated by the traffic light indication information generator (e.g., 1003 of FIG. 1) may be transmitted to the cluster 2100 through the communication device (e.g., 1001 of FIG. 1).

The traffic light indication information or the portable device traffic light indication information 2101 may indicate information on a traffic light corresponding to a navigation guidance route or a portable device guidance route among the recognized traffic lights.

For example, the traffic light corresponding to the navigation guidance route may be a four-color lamp including red, yellow, arrow, and green signals. In this case, it is possible to display what kind of signals can be lighten by the above-described four-color lamp and display the currently lighted signal to guide the driver, like the traffic light indication information or the portable device traffic light indication information 2101 of FIG. 2A.

Here, the shape in which the traffic light indication information or the portable device traffic light indication information 2101 is displayed is exemplary and does not necessarily have to be the same as the shape and position of the traffic light. The shape or location in which the traffic light indication information or the portable device traffic light indication information 2101 is displayed through the cluster 2100 may be different from the shape or location shown in FIG. 2A according to a user's settings or the arrangement of the remaining elements displayed in the cluster 2100.

FIG. 2B is a diagram illustrating an example in which traffic light indication information 2201 is displayed on a vehicle navigation monitor 2200.

The navigation monitor 2200 may be provided in a vehicle including a vehicle traffic light information display apparatus (e.g., 1000 in FIG. 1).

The map, time, and shape and arrangement of a navigation user interface (UI) constituting the navigation monitor 2200 of FIG. 2B may be one of examples for helping understanding of the embodiment.

The traffic light indication information 2101 generated by the traffic light indication information generator (e.g., 1003 of FIG. 1) may be transmitted to the navigation monitor 2200 through the communication device (e.g., 1001 of FIG. 1).

The traffic light indication information 2201 may display information on a traffic light corresponding to a navigation guidance route among the recognized traffic lights.

For example, the traffic light corresponding to the navigation guidance route may be a four-color lamp including red, yellow, arrow, and green signals. In this case, like the traffic light indication information 2101 of FIG. 2A, it is possible to display what kind of signals can be lighten by the above-described four-color lamp and display the currently lighted signal to guide the driver.

Here, the shape in which the traffic light indication information 2201 is displayed is exemplary, and the shape and position of the traffic light do not necessarily have to be the same as those shown in this drawing. The shape or location in which the traffic light indication information 2201 is displayed through the navigation monitor 2200 may be different from the shape or location shown in FIG. 2B according to a user's setting and the arrangement of the remaining elements displayed on the navigation monitor 2200.

Figure 3:
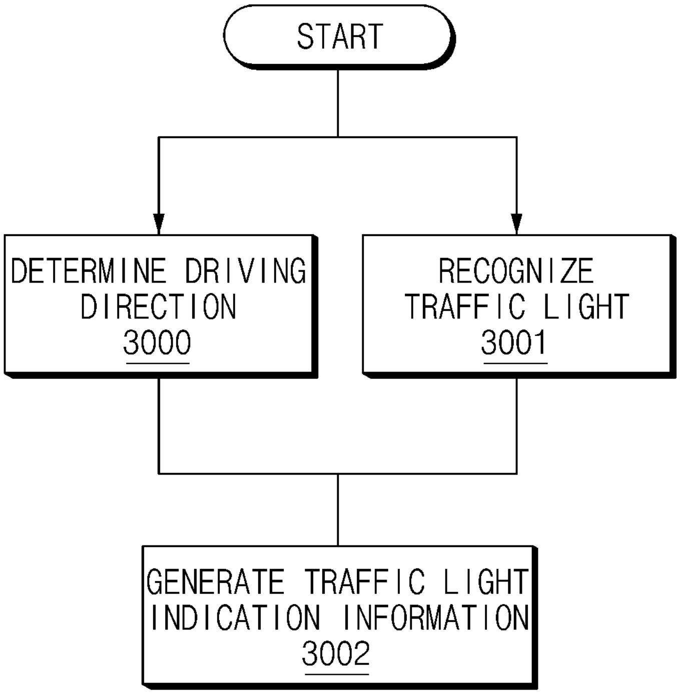
FIG. 3 is a diagram illustrating an example in which traffic light indication information is generated by a vehicle traffic light information display apparatus and method according to another embodiment of the present disclosure.

FIG. 3 is a diagram illustrating an example in which traffic light indication information (e.g., 2101 or 2201 in FIG. 2) is generated (3002) by a vehicle traffic light information display apparatus (e.g., 1000 in FIG. 1) and method according to another embodiment of the present disclosure.

The driving direction determiner (e.g., 1002 of FIG. 1) may determine the driving direction of a vehicle (3000).

In particular, the driving direction determiner may determine a driving direction of the vehicle based on one or more of the vehicle surrounding image, the vehicle location information, the lane driving direction information, or the turn indicator status information. (3000).

For example, the driving direction determiner may recognize a road printed traffic sign around the vehicle including a lane through a vehicle surrounding image and determine the driving direction by determining which direction the vehicle can currently drive in based on the road printed traffic sign (3000).

For another example, the driving direction determiner may determine the driving direction by determining a specific lane in which the vehicle is located based on one or more of location information of the vehicle or lane driving direction information and determining in which direction the vehicle can drive. (3000).

For still another example, the driving direction determiner may determine the driving direction to determine in which direction a driver intends to drive by determining which turn indicator is being turned on or which turn indicator is not being turned on based on turn indicator status information (3000).

The driving direction determiner may use various combinations of the vehicle surrounding image, location information, lane driving direction information, or turn indicator status information to more precisely determine the driving direction (3000).

The traffic light indication information generator (e.g., 1003 of FIG. 1) may recognize a traffic light around the vehicle based on a vehicle surrounding image (3001).

The vehicle surrounding image used to recognize traffic lights around the vehicle (3001) may be the same as or different from a vehicle surrounding image provided to recognize the a road printed traffic sign for the driving direction determiner to determine the driving direction (3000).

The traffic light indication information generator may store the shape of a traffic light and the type, shape and arrangement of a traffic signal in advance or acquire the same through learning and recognize the traffic light of the vehicle surrounding image based on the shape of the traffic light and the type, shape and arrangement of the traffic signal (3001).

In addition, the traffic light indication information generator may recognize traffic lights around the vehicle based on traffic light information for each road received through a communication device (e.g., 1001 in FIG. 1) from a navigation system provided in the vehicle or a portable device (3001).

Determining, by the driving direction determiner, the driving direction of the vehicle (3000) and recognizing, by the traffic light indication information generator, the traffic light (3001) do not necessarily have to be performed at the same time, and after the driving direction is determined (3000), the traffic light may be recognized (3001), or after the traffic light is recognized (3001), the driving direction may be determined (3000).

The traffic light indication information generator may generate traffic light indication information based on one or more of the recognized traffic light, the driving direction, or the navigation guidance route (3002).

In particular, when the driving direction matches the direction of the navigation guidance route, the traffic light indication information generator may generate traffic light indication information for a traffic light corresponding to the navigation guidance route among the recognized traffic lights (3002).

For example, when the direction of the navigation guidance route is a straight direction at an intersection that is a crossroad, and it is determined that the driving direction is also the straight direction, the traffic light indication information generator may generate traffic light indication information for a traffic light for the vehicle to comply with for the straight direction which is the direction of the navigation guidance route, among the recognized traffic lights (3002).

For another example, when the direction of the navigation guidance route is a U-turn direction, and it is determined that the driving direction is also the U-turn direction, the traffic light indication information generator may generate traffic light indication information for a traffic light for the vehicle to comply with for the U-turn direction which is the direction of the navigation guidance route, among the recognized traffic lights (3002).

Figure 4:
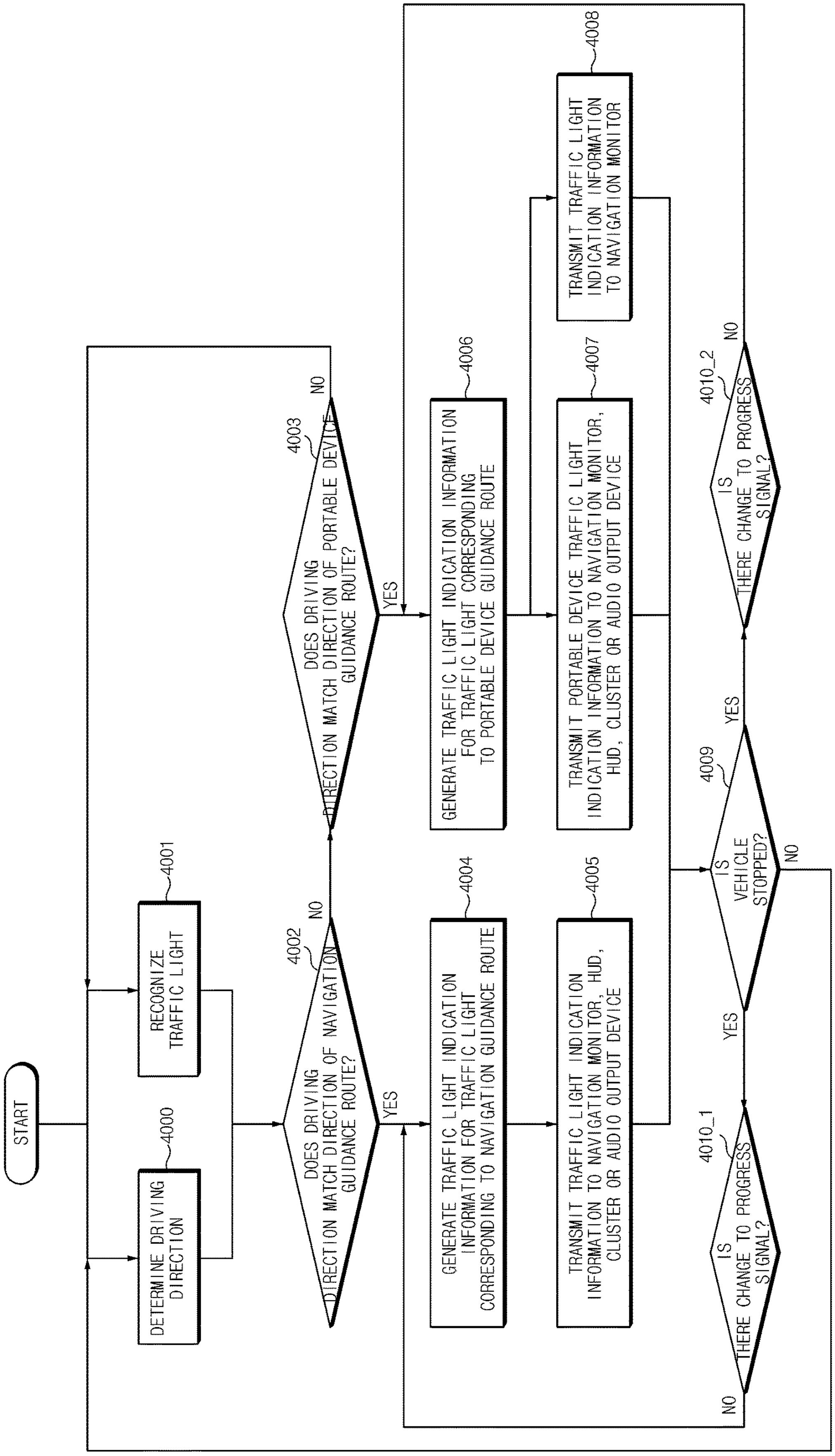
FIG. 4 is a diagram illustrating an example in which traffic light indication information or portable device traffic light indication information is generated by a vehicle traffic light information display apparatus and method according to another embodiment of the present disclosure.

FIG. 4 is a diagram illustrating an example in which traffic light indication information (e.g., 2101 or 2201 in FIG. 2) or portable device traffic light indication information is generated by a vehicle traffic light information display apparatus (e.g., 1000 in FIG. 1) and method according to another embodiment of the present disclosure.

The communication device (e.g., 1001 of FIG. 1) may further receive a portable device guidance route. Here, the portable device guidance route may be generated by, for example, a navigation application included in a portable device capable of communicating with a vehicle or the vehicle traffic light information display apparatus.

A destination of the portable device guidance route may be different from a destination of the navigation guidance route. Also, even when the destination of the portable device guidance route is identical to that of and the navigation guidance route, the portable device guidance route and the navigation guidance route may be identical to or different from each other.

The driving direction determiner (e.g., 1002 of FIG. 1) may determine a driving direction of the vehicle based on one or more of the vehicle surrounding image, the vehicle location information, the lane driving direction information, or the turn indicator status information (4000).

The traffic light indication information generator (e.g., 1003 of FIG. 1) may recognize a traffic light around the vehicle based on a vehicle surrounding image (4001).

The traffic light indication information generator may determine whether the driving direction matches the direction of the navigation guidance route (4002), and when the driving direction matches the direction of the navigation guidance route (YES in 4002), generate traffic light indication information for a traffic light corresponding to the navigation guidance route (4004).

Here, the traffic light indication information generator may generate traffic light indication information based on one or more of the recognized traffic light, the driving direction, or the navigation guidance route (4004).

The communication device may transmit the generated traffic light indication information to one or more of a vehicle navigation monitor, an HUD, a cluster, and an audio output device (4005).

One or more of the navigation monitor, HUD, cluster, or audio output device of the vehicle may visually or audibly express the received (4005) traffic light indication information to guide the driver.

An example in which a navigation monitor, a HUD, a cluster, or an audio output device guides a user with traffic light indication information may be the same as or similar to the description with respect to FIGS. 2A and 2B.

Meanwhile, the traffic light indication information generator may determine whether a driving direction matches the direction of a navigation guidance route (4002), and when the driving direction does not match the direction of the navigation guidance route (NO in 4002), determine whether the driving direction matches the direction of a portable device guidance route (YES in 4003), and when the driving direction matches the direction of the portable device guidance route (YES in 4003), generate portable device traffic light indication information for a traffic light corresponding to the portable device guidance route among recognized traffic lights (4006).

In other words, when the driving direction does not match the direction of the navigation guidance route and matches the direction of the portable device guidance route (YES in 4003), the traffic light indication information generator may generate the portable device traffic light indication information based on one or more of recognized traffic lights, the driving direction, or the portable device guidance route (4006).

In addition, the communication device may transmit the generated portable device traffic light indication information to one or more of the HUD, the cluster, the audio output device, or the portable device (4007), and transmit the generated traffic light indication information to the navigation monitor (4008).

One or more of the HUD, the cluster, the audio output device, or the portable device of the vehicle may visually or audibly express the received (4005) portable device traffic light indication information to guide the driver.

An example in which the HUD, the cluster, the audio output device, or the portable device guides the user with the portable device traffic light indication information may be the same as or similar to the description of FIG. 2A.

Here, the portable device traffic light indication information may relate to a traffic light corresponding to the portable device guidance route, and the traffic light indication information may relate to a traffic light corresponding to the navigation guidance route, so that they may be distinguished from each other.

On the other hand, when the driving direction does not match the direction of the portable device guidance route (NO in 4003), the driving direction determiner may determine the driving direction of the vehicle again (4000), and the traffic light indication information generator may recognize traffic lights around the vehicle again (4001). Thereafter, a vehicle traffic light display device may perform the above-described operations again.

On the other hand, when the vehicle is driving in a state in which the traffic light indication information is generated or the portable device traffic light indication information is generated (NO in 4009), the driving direction determiner may determine the driving direction again (4000), and the traffic light indication information generator may recognize traffic lights around the vehicle again (4001). Thereafter, the vehicle traffic light display device may perform the above-described operations again.

On the other hand, when the vehicle is stopped while the traffic light indication information is generated or the portable device traffic light indication information is generated (YES in 4009), the traffic light indication information generator may again generate the traffic light indication information (4004) in response to the traffic light corresponding to the navigation guidance route being a stop signal for the navigation guidance route (No of 4010_1), or again generate the traffic light indication information (4006) in response to the traffic light corresponding to the portable device guidance route being a stop signal for the portable device guidance route (NO of 4010_2). Thereafter, the vehicle traffic light display device may perform the above-described operations after 4004 or 4006 again.

Here, the stop signal does not mean a case in which a traffic light is lighting a red signal. Further, a progress signal may not mean a case in which a traffic light is lighting a green signal and mean a signal that needs to be lighten in order for a vehicle, which is stopped according to the navigation guidance route or the portable device guidance route, to start to drive.

For example, when the driving direction of the vehicle is a U-turn and a traffic light corresponding to a navigation guidance route needs to light a red signal in order for the vehicle to make a U-turn, the red signal may be a progress signal and a green signal, or a yellow signal may be a stop signal.

For another example, when the driving direction of the vehicle is a left turn and a left turn arrow signal is to be lighten in the traffic light corresponding to the portable device guidance route in order for the vehicle to turn left, the left turn arrow signal may be a progress signal, and the green, yellow and red signals are stop signals.

For another example, when the driving direction of the vehicle is a straight direction and the traffic light corresponding to the navigation guidance route needs to light a green signal in order for the vehicle to go straight, the green signal is a progress signal, and the red, yellow, and left turn arrow signals are stop signals.

Figure 5:
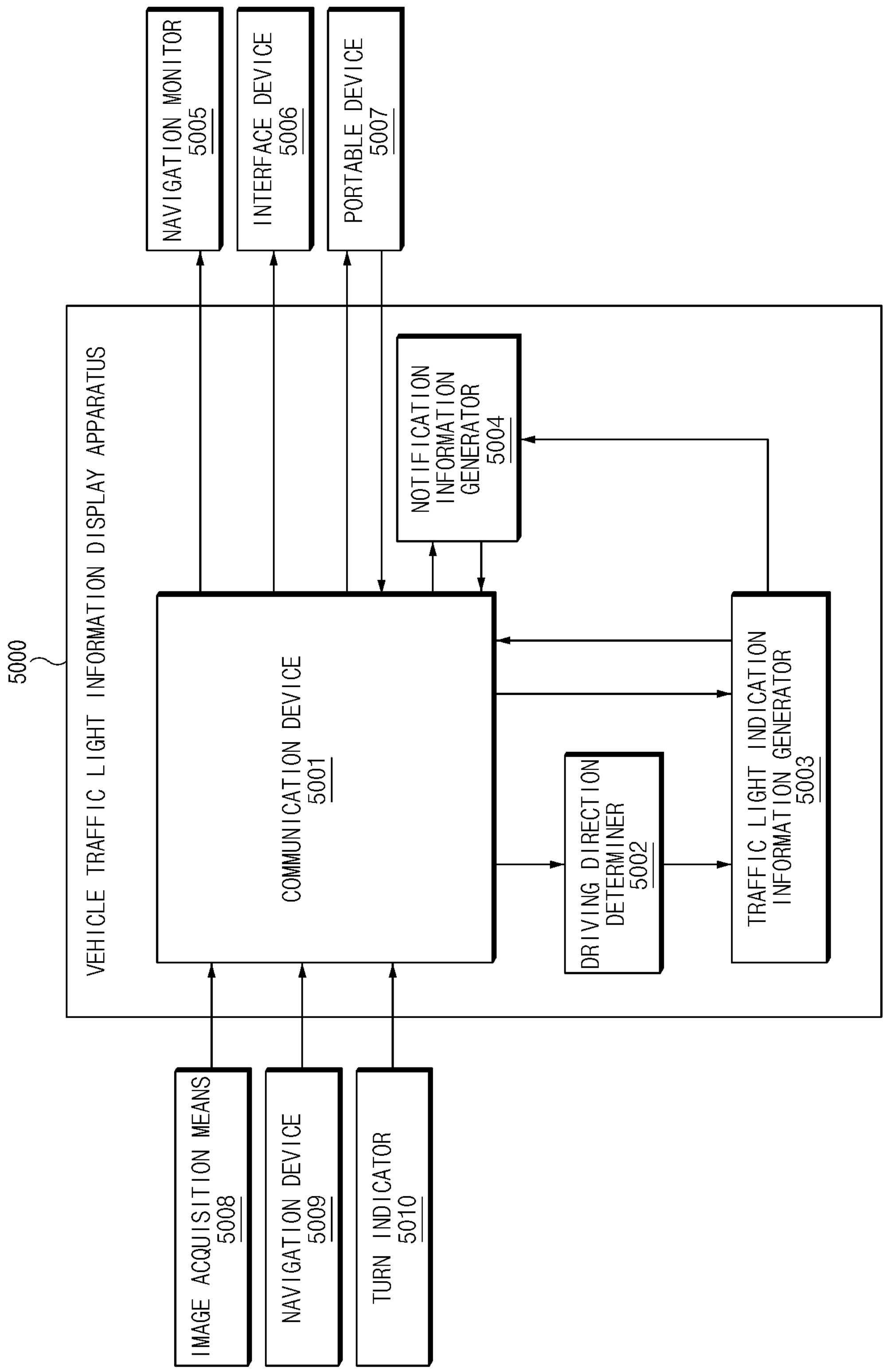
FIG. 5 is a diagram illustrating a vehicle traffic light information display apparatus according to another embodiment of the present disclosure.

FIG. 5 is a diagram illustrating a vehicle traffic light information display apparatus 5000 according to another embodiment of the present disclosure.

The vehicle traffic light information display apparatus 5000 may include a communication device 5001, a driving direction determiner 5002, a traffic light indication information generator 5003, and a notification information generator 5004.

The communication device 5001 may receive a vehicle surrounding image from an image acquisition means 5008. The image acquisition means 5008 may be a camera provided in a vehicle but is not limited thereto.

The communication device 5001 may receive one or more of location information of the vehicle, lane driving direction information, or a navigation guidance route from a navigation device 5009. The navigation device 5009 may be a system provided in a vehicle.

The communication device 5001 may receive one or more of turn indicator status information from a turn indicator 5010 or a steering wheel.

The communication device 5001 may receive one or more of the vehicle location information, the lane driving direction information, and a portable device guidance route from a portable device 5007.

The communication device 5001 may transmit one or more of the vehicle surrounding image, the vehicle location information, the lane driving direction information, or the turn indicator status information to the driving direction determiner 5002, and transmit one or more of the vehicle surrounding image, the navigation guidance route, or the portable device guidance route to the traffic light indication information generator 5003.

The driving direction determiner 5002 may determine a driving direction of the vehicle based on one or more of the vehicle surrounding image, the vehicle location information, the lane driving direction information, or the turn indicator status information.

In addition, the driving direction determiner 5002 may transmit the determined driving direction of the vehicle to the traffic light indication information generator 5003.

The traffic light indication information generator 5003 may recognize traffic lights around the vehicle based on the vehicle surrounding image and generate one or more of traffic light indication information or portable device traffic light indication information based on one or more of the recognized traffic lights, the driving direction, the navigation guidance route or the portable device guidance route.

In addition, the traffic light indication information generator 5003 may transmit one or more of the generated traffic light indication information or the portable device traffic light indication information to the communication device 5001 or the notification information generator 5004.

The notification information generator 5004 may receive one or more of the vehicle surrounding image, the vehicle location information, the navigation guidance route, or the portable device guidance route from the communication device 5001 and receive one or more of the traffic light indication information or the portable device traffic light indication information from the traffic light indication information generator 5003.

Further, when the vehicle is being stopped while the traffic light indication information is generated, the notification information generator 5004 may generate vehicle departure notification information in response to the traffic light corresponding to the navigation guidance route being changed to a progress signal for the navigation guidance route.

In addition, when the vehicle is being stopped while the portable device traffic light indication information is generated, the notification information generator 5004 may generate vehicle departure notification information in response to the traffic light corresponding to the portable device guidance route being changed to a progress signal for the portable device guidance route.

The generation of the vehicle departure notification information by the notification information generator 5004 will be described in detail with reference to FIG. 6.

In addition, the notification information generator 5004 may transmit the generated vehicle departure notification information to the communication device 5001.

The communication device 5001 may transmit the vehicle departure notification information to one or more of a navigation monitor 5005, a HUD, a cluster, an audio output device, or the portable device 5007.

The communication device 5001 may transmit the traffic light indication information to the navigation monitor 5005 or an interface device 5006.

Here, the navigation monitor 5005 may be provided in the vehicle, and the interface device 5006 may include one or more of the HUD, the cluster, or the audio output device.

Further, the communication device 5001 may transmit the traffic light indication information to the navigation monitor 5005 and transmit the portable device traffic light indication information to one or more of the interface device 5006 or the portable device 5007.

The navigation monitor 5005 may display the received traffic light indication information to guide a driver.

The interface device 5006 may display the received traffic light indication information or portable device traffic light indication information to guide the driver.

FIG. 2A is a diagram illustrating an example in which the interface device 5006 displays traffic light indication information or portable device traffic light indication information to guide a driver, and FIG. 2B is a diagram illustrating an example in which the navigation monitor 5005 displays traffic light indication information to guide a driver or an example in which the portable device 5007 displays portable device traffic light indication information to guide a driver In addition, the navigation monitor 5005, the interface device 5006, or the portable device 5007 may display vehicle departure notification information to guide the user.

Figure 6:
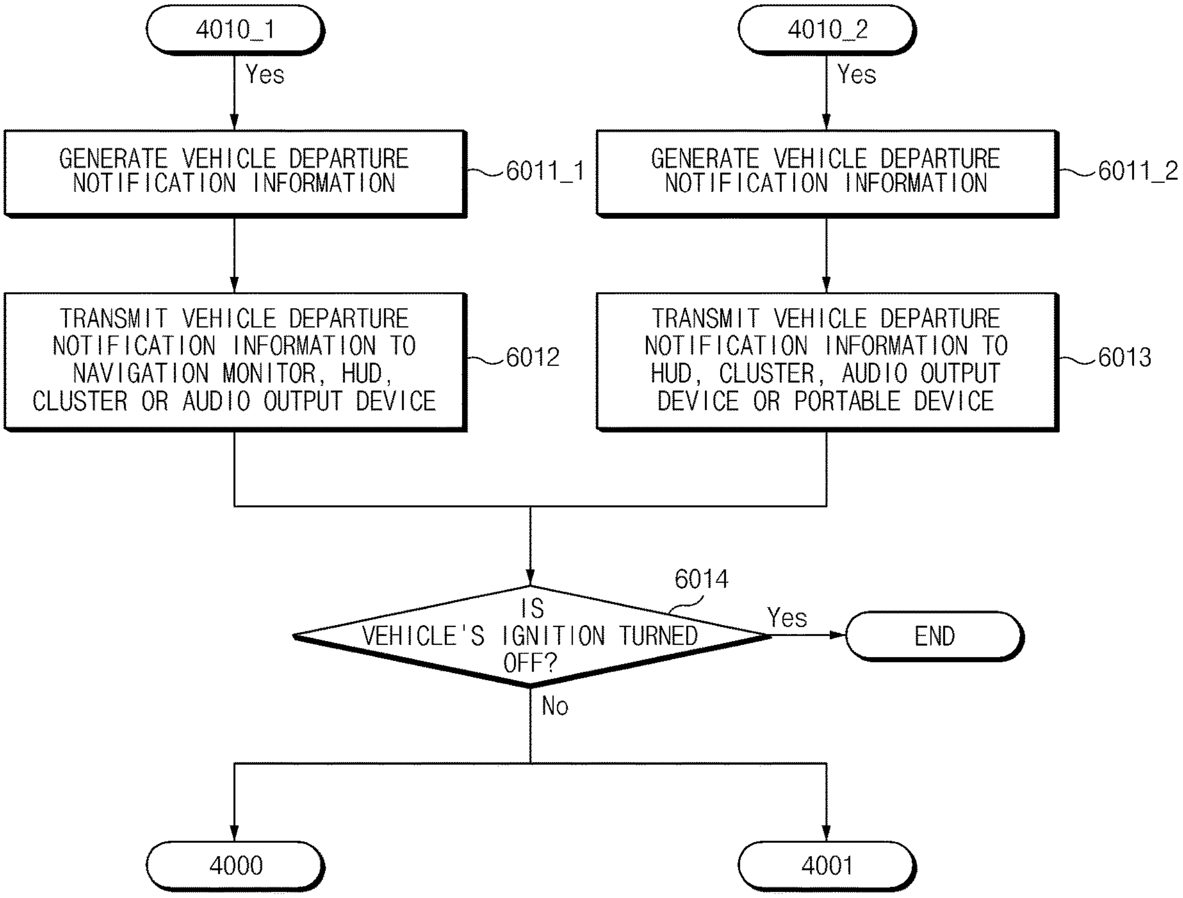
FIG. 6 is a diagram showing an example of generating vehicle departure notification information by a vehicle traffic light information display apparatus and method according to another embodiment of the present disclosure.

FIG. 6 is a diagram showing an example of generating vehicle departure notification information by a vehicle traffic light information display apparatus (e.g., 5000 in FIG. 5) and method according to another embodiment of the present disclosure.

4010_1 of FIG. 6 may be 4010_1 of FIG. 4, and 4010_2 of FIG. 6 may be 4010_2 of FIG. 4.

When the vehicle is being stopped while the traffic light indication information is generated, a notification information generator (e.g., 5004 of FIG. 5) may generate vehicle departure notification information (6011_1) in response to the traffic light corresponding to the navigation guidance route being changed to a progress signal for the navigation guidance route (Yes of 4010_1).

In this case, the communication device (e.g., 5001 of FIG. 5) may transmit the vehicle departure notification information to one or more of the navigation monitor, the HUD, the cluster, or the audio output device (6012).

Here, the stop signal does not mean a case in which a traffic light is lighting a red signal. Further, a progress signal may not mean a case in which a traffic light is lighting a green signal and mean a signal that needs to be lighten for a vehicle, which is stopped according to the navigation guidance route, to start to drive.

For example, when the driving direction of the vehicle is a U-turn direction and a traffic light corresponding to a navigation guidance route needs to light a red signal for the vehicle to make a U-turn, the red signal may be a progress signal and a green signal, or a yellow signal may be a stop signal.

For another example, when the driving direction of the vehicle is a left turn and the traffic light corresponding to the navigation guidance route needs to light a left turn arrow signal in order for the vehicle to turn left, the left turn arrow signal is a progress signal, and the green, yellow, and red signals are stop signals.

For another example, when the driving direction of the vehicle is a straight direction and the traffic light corresponding to the navigation guidance route needs to light a green signal in order for the vehicle to go straight, the green signal is a progress signal, and the red, yellow, and left arrow signals are stop signals.

On the other hand, when the vehicle is being stopped while the portable device traffic light indication information is generated, a notification information generator may generate vehicle departure notification information (6011_2) in response to the traffic light corresponding to the portable device guidance route being changed to a progress signal for the portable device guidance route (Yes of 4010_2).

In this case, the communication device may transmit the vehicle departure notification information to one or more of a HUD, a cluster, an audio output device, or a portable device (6013).

Here, the stop signal does not mean a case in which a traffic light is lighting a red signal. Further, a progress signal may not mean a case in which a traffic light is lighting a green signal and mean a signal that needs to be lighten for a vehicle, which is stopped according to the portable device guidance route, to start to drive.

For example, when the driving direction of the vehicle is a U-turn direction and a traffic light corresponding to a portable device guidance route needs to light a red signal for the vehicle to make a U-turn, the red signal may be a progress signal and a green signal, or a yellow signal may be a stop signal.

For another example, when the driving direction of the vehicle is a left turn and the traffic light corresponding to the portable device guidance route needs to light a left turn arrow signal in order for the vehicle to turn left, the left turn arrow signal is a progress signal, and the green, yellow, and red signals are stop signals.

For another example, when the driving direction of the vehicle is a straight direction and the traffic light corresponding to the portable device guidance route needs to light a green signal in order for the vehicle to go straight, the green signal is a progress signal, and the red, yellow, and left arrow signals are stop signals.

When the vehicle's ignition is not turned off (No in 6014), the driving direction determiner (e.g., 5002 in FIG. 5) may determine the driving direction again (4000), and the traffic light indication information generator 5003 may recognize the traffic lights around the vehicle again (4001). Thereafter, the vehicle traffic light display device may perform the above-described operations again.

Meanwhile, when the vehicle's ignition is turned off (Yes of 6014), the vehicle traffic light display device may end the operation.

Figure 7:
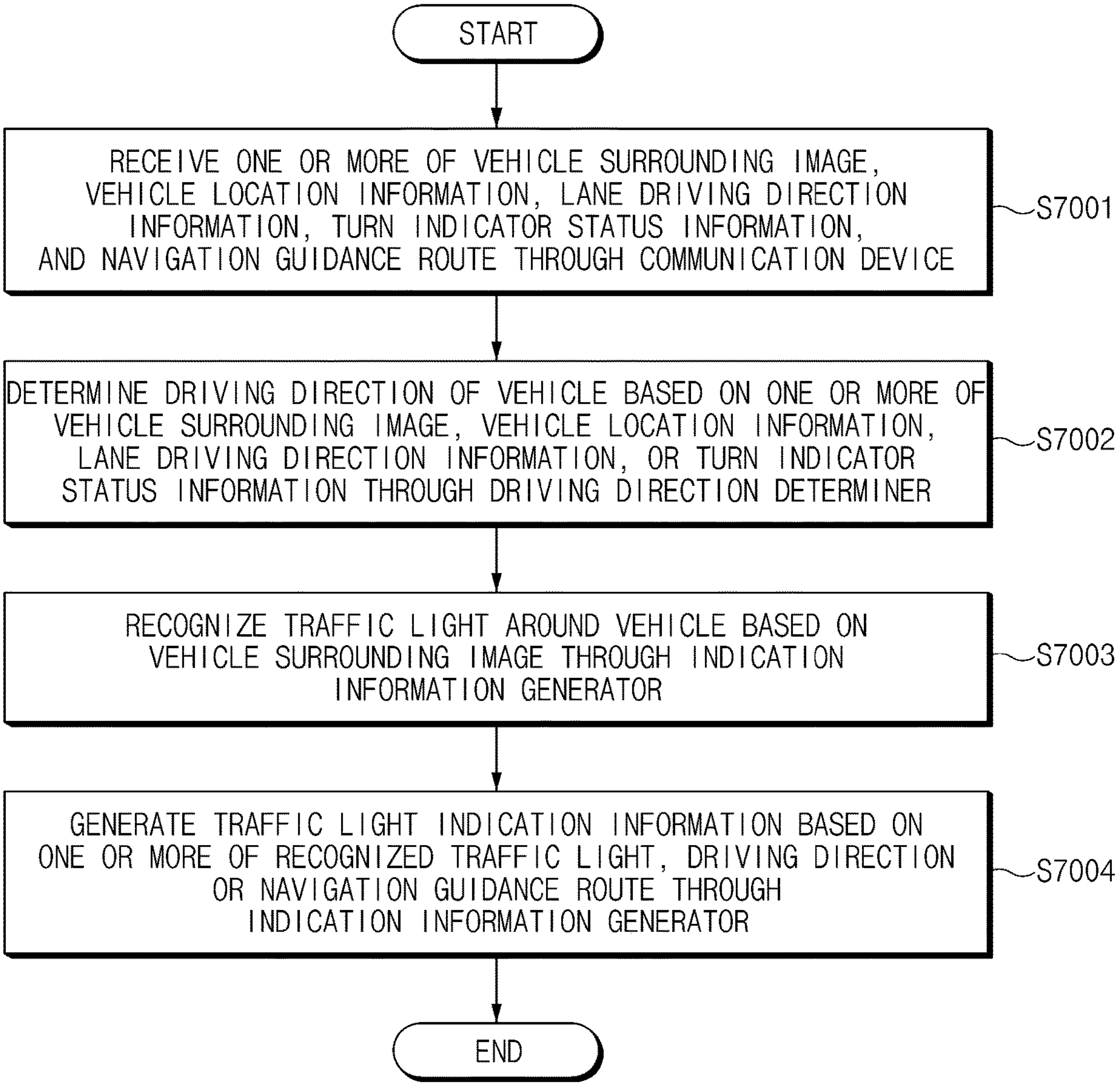
FIG. 7 is a diagram illustrating a vehicle traffic light information display method according to another embodiment of the present disclosure.

FIG. 7 is a diagram illustrating a vehicle traffic light information display method according to another embodiment of the present disclosure.

The vehicle traffic light information display apparatus 1000 or 5000 described above with reference to FIGS. 1 to 6 may perform the method described in FIG. 7.

The vehicle traffic light information display method may include receiving, by a communication device, one or more of a vehicle surrounding image, vehicle location information, lane driving direction information, turn indicator status information, and a navigation guidance route (S7001), determining, by a driving direction determiner, a driving direction of the vehicle based on one or more of the vehicle surrounding image, the vehicle location information, the lane driving direction information, or the turn indicator status information (S7002), recognizing, by a traffic light indication information generator, traffic lights around the vehicle based on the vehicle surrounding image (S7003), and generating, by the traffic light indication information generator, traffic light indication information based on one or more of the recognized traffic light, the driving direction, or the navigation guidance route (S7004).

S7001 may be performed through the communication device 1001 or 5001 described above with reference to FIGS. 1 to 6.

The vehicle surrounding image may be obtained from image acquisition means such as a camera provided in the vehicle, but the means for obtaining the vehicle surrounding image is not limited to the camera provided in the vehicle.

The vehicle location information, the lane driving direction information, or the navigation guidance route may be received from a navigation device provided in the vehicle, or a portable device, but the means for obtaining one or more of the vehicle location information, the lane driving direction information, or the navigation guidance route may not be limited to the navigation device or the portable device.

The turn indicator status information may be received from a steering wheel or a turn indicator, but the means for obtaining the turn indicator status information is not limited to the steering wheel or the turn indicator.

S7002 may be performed through the driving direction determiner 1002 or 5002 described above with reference to FIGS. 1 to 6.

The driving direction may include, but is not limited to, a straight direction, a left turn, a right turn, a U-turn, or a direction of a lane in which the vehicle is to drive in an intersection in which multiple lanes exist.

S7003 may be performed through the traffic light indication information generator 1003 or 5003 described above with reference to FIGS. 1 to 6.

That is, the vehicle traffic light information display method may include recognizing traffic lights around the vehicle based on the vehicle surrounding image through the traffic light indication information generator.

S7004 may be performed through the traffic light indication information generator 1003 or 5003 described above with reference to FIGS. 1 to 6.

The traffic light indication information may indicate information on a traffic light corresponding to a navigation guidance route or a portable device guidance route among recognized traffic lights.

In the vehicle traffic light information display method, the generating of the traffic light indication information includes, generating, by a traffic light indication information generator, the traffic light indication information for a traffic light corresponding to the navigation guidance route among the recognized traffic lights when the driving direction matches the direction of the navigation guidance route.

In addition, the vehicle traffic light information display method may further include transmitting, by a communication device, the generated traffic light indication information to one or more of a vehicle navigation monitor, a HUD, a cluster, or an audio output device.

In addition, the vehicle traffic light information display method may further include receiving, by the communication device, a portable device guidance route, and the generating of the traffic light indication information includes, generating, by the traffic light indication information generator, portable device traffic light indication information for a traffic light corresponding to a portable device guidance route among the recognized traffic lights when the driving direction does not match the direction of the navigation guidance route and matches a direction of the portable device guidance route.

In addition, the vehicle traffic light information display method may further include transmitting, by the communication device, the generated portable device traffic light indication information to one or more of a HUD, a cluster, an audio output device, or a portable device, and transmitting, by the communication device, the generated traffic light indication information to a navigation monitor of the vehicle.

In addition, the vehicle traffic light information display method may further include again determining, by the driving direction determiner, the driving direction and again recognizing, by the traffic light indication information generator, traffic lights around the vehicle when the driving direction does not match both the direction of the navigation guidance route and the direction of the portable device guidance route.

In addition, the vehicle traffic light information display method may further include again determining, by a driving direction determiner, the driving direction and again recognizing, by a traffic light indication information generator, traffic lights around the vehicle when the vehicle is driving in a state in which the traffic light indication information or the portable device traffic light indication information is generated.

In addition, the vehicle traffic light information display method may further include again generating, by the traffic light indication information generator, the traffic light indication information in response to a traffic light corresponding to the navigation guidance route being a stop signal for the navigation guidance route or again generating, by the traffic light indication information generator, the portable device traffic light indication information in response to a traffic light corresponding to the portable device guidance route being a stop signal for the portable device guidance route when the vehicle is stopped while the traffic light indication information is generated.

In addition, the vehicle traffic light information display method may further include generating, by a notification information generator, vehicle departure notification information in response to a traffic light corresponding to the navigation guidance route being changed to a progress signal for the navigation guidance route and transmitting, by the communication device, the vehicle departure notification information to one or more of a navigation monitor, a HUD, a cluster, or an audio output device of the vehicle when the vehicle is stopped while the traffic light indication information is generated.

In addition, the vehicle traffic light information display method may further include generating, by a notification information generator, vehicle departure notification information in response to a traffic light corresponding to the portable device guidance route being changed to a progress signal for the portable device guidance route and transmitting, by the communication device, the vehicle departure notification information to one or more of the HUD, the cluster, the audio output device, or the portable device when the vehicle is stopped while the portable device traffic light indication information is generated.

The above description is merely illustrative of the technical idea of embodiments of the present disclosure, and various modifications and variations may be made without departing from the essential characteristics of embodiments of the present disclosure by those skilled in the art to which embodiments of the present disclosure pertain.

Accordingly, the embodiment disclosed in the present disclosure is not intended to limit the technical idea of the present disclosure but to describe the present disclosure, and the scope of the technical idea of the present disclosure is not limited by the embodiment. The scope of protection of the present disclosure should be interpreted by the following claims, and all technical ideas within the scope equivalent thereto should be construed as being included in the scope of the present disclosure.

The effects of the vehicle traffic light information display apparatus and method according to the present disclosure are given as follows.

According to at least one of the embodiments of the present disclosure, it is possible to provide a vehicle traffic light information display apparatus and method for determining a driving direction of a vehicle based on at least one of the vehicle surrounding image, the vehicle location information, the lane driving direction information, and the turn indicator status information, recognizing a traffic light around the vehicle based on the vehicle surrounding image and generating traffic light indication information based on at least one of the recognized traffic light, the driving direction, and the navigation guidance route.

According to at least one of the embodiments of the present disclosure, it is possible to provide a vehicle traffic light information display apparatus and method for generating traffic light indication information when a driving direction matches a direction of a navigation guidance route.

According to at least one of the embodiments of the present disclosure, it is possible to provide a vehicle traffic light information display apparatus and method for transmitting traffic light indication information to one or more of a vehicle navigation monitor, a HUD, a cluster, or an audio output device.

According to at least one of the embodiments of the present disclosure, it is possible to provide a vehicle traffic light information display apparatus and method for generating portable device traffic light indication information when a driving direction matches a direction of a portable device guidance route.

According to at least one of the embodiments of the present disclosure, it is possible to provide a vehicle traffic light information display apparatus and method for transmitting portable device traffic light indication information to one or more of a HUD, a cluster, or an audio output device, and transmitting the traffic light indication information to a navigation monitor of a vehicle.

According to at least one of the embodiments of the present disclosure, it is possible to provide a vehicle traffic light information display apparatus and method for generating vehicle departure notification information in response to a traffic light being changed to a progress signal when a vehicle is stopped and transmitting the vehicle departure notification information to one or more of a vehicle navigation monitor, an HUD, a cluster, or an audio output device.

In addition, various effects directly or indirectly figured out through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle traffic light information display apparatus, comprising:

a communication device including a transceiver and configured to receive at least one of a vehicle surrounding image, vehicle location information, lane driving direction information, turn indicator status information, a navigation guidance route, or any combination thereof; and a processor including:

a driving direction determiner configured to determine a driving direction of a vehicle based on at least one of the vehicle surrounding image, the vehicle location information, the lane driving direction information, the turn indicator status information, or any combination thereof; and a traffic light indication information generator configured to recognize a traffic light around the vehicle based on the vehicle surrounding image and generate traffic light indication information based on at least one of the recognized traffic light, the driving direction, the navigation guidance route, or any combination thereof;

wherein the communication device is further configured to receive a portable device guidance route from a portable device, wherein the portable device guidance route is generated by a navigation application included in the portable device, wherein, when the driving direction does not match the direction of the navigation guidance route and matches a direction of the portable device guidance route, the traffic light indication information generator generates portable device traffic light indication information for a traffic light corresponding to the portable device guidance route among the recognized traffic lights, and wherein the portable device traffic light indication information is output through one or more of a navigation monitor or cluster;

wherein the navigation monitor or the cluster is configured to:

display types of signals that can be lighted by the traffic light corresponding to the portable device guidance route; and display the portable device traffic light indication information as a currently lighted signal of the types of signals to guide a driver;

wherein the portable device guidance route and the navigation guidance route are different from each other; and wherein the portable device includes a portable device of ger including a driver.

2. The vehicle traffic light information display apparatus of claim 1, wherein when the driving direction matches the direction of the navigation guidance route, the traffic light indication information generator generates the traffic light indication information for a traffic light corresponding to the navigation guidance route among the recognized traffic lights.

3. The vehicle traffic light information display apparatus of claim 2, wherein the communication device is further configured to transmit the generated traffic light indication information to one or more of the navigation monitor of the vehicle, a head-up display (HUD), the cluster, or an audio output device.

4. The vehicle traffic light information display apparatus of claim 2, when the vehicle is stopped while the traffic light indication information is generated:

wherein the processor further comprises a notification information generator configured to generate vehicle departure notification information in response to a traffic light corresponding to the navigation guidance route being changed to a progress signal for the navigation guidance route, and, wherein the communication device transmits the vehicle departure notification information to one or more of the navigation monitor of the vehicle, a head-up display (HUD), the cluster, or an audio output device.

5. The vehicle traffic light information display apparatus of claim 1, wherein the communication device is further configured to transmit the generated portable device traffic light indication information to one or more of a HUD, the cluster, an audio output device, or the portable device, and transmits the generated traffic light indication information to a navigation monitor of the vehicle.

6. The vehicle traffic light information display apparatus of claim 1, wherein when the driving direction does not match both the direction of the navigation guidance route and the direction of the portable device guidance route:

the driving direction determiner again determines the driving direction, and the traffic light indication information generator again recognizes traffic lights around the vehicle.

7. The vehicle traffic light information display apparatus of claim 1, wherein when the vehicle is driving in a state in which the traffic light indication information or portable device traffic light indication information is generated:

the driving direction determiner again determines the driving direction, and the traffic light indication information generator again recognizes traffic lights around the vehicle.

8. The vehicle traffic light information display apparatus of claim 1, wherein when the vehicle is stopped while the traffic light indication information is generated:

the traffic light indication information generator again generates the traffic light indication information in response to a traffic light corresponding to the navigation guidance route being a stop signal for the navigation guidance route or again generates portable device traffic light indication information in response to a traffic light corresponding to a portable device guidance route being a stop signal for the portable device guidance route.

9. The vehicle traffic light information display apparatus of claim 1, when the vehicle is stopped while the traffic light indication information is generated:

wherein the processor further comprises a notification information generator configured to generate vehicle departure notification information in response to a traffic light corresponding to the portable device guidance route being changed to a progress signal for the portable device guidance route, and wherein the communication device transmits the vehicle departure notification information to one or more of a HUD, the cluster, an audio output device, or the portable device.

10. A vehicle traffic light information display method, comprising:

receiving, by a communication device, at least one of a vehicle surrounding image, vehicle location information, lane driving direction information, turn indicator status information, a navigation guidance route, or any combination thereof;

determining, by a driving direction determiner, a driving direction of a vehicle based on at least one of the vehicle surrounding image, the vehicle location information, the lane driving direction information, the turn indicator status information, or any combination thereof;

recognizing, by a traffic light indication information generator, traffic lights around the vehicle based on the vehicle surrounding image;

generating, by the traffic light indication information generator, traffic light indication information based on at least one of the recognized traffic light, the driving direction, the navigation guidance route, or any combination thereof;

receiving, by the communication device, a portable device guidance route from a portable device;

wherein the portable device guidance route is generated by a navigation application included in the portable device; and when the driving direction does not match the direction of the navigation guidance route and matches a direction of the portable device guidance route, the generating of the traffic light indication information comprises, generating, by the traffic light indication information generator, portable device traffic light indication information for a traffic light corresponding to a portable device guidance route among the recognized traffic lights;

wherein the portable device traffic light indication information is output through one or more of a navigation monitor or a cluster;

wherein the navigation monitor or the cluster is configured to:

display types of signals that can be lighted from the traffic light corresponding to the navigation guidance route; and display the portable device traffic light indication information as a currently lighted signal of the types of signals to guide a driver, wherein the portable device guidance route and the navigation guidance route are different from each other; and wherein the portable device includes a portable device of a ger including a driver.

11. The vehicle traffic light information display method of claim 10, wherein when the driving direction matches the direction of the navigation guidance route, the generating of the traffic light indication information comprises, generating, by the traffic light indication information generator, the traffic light indication information for a traffic light corresponding to the navigation guidance route among the recognized traffic lights.

12. The vehicle traffic light information display method of claim 11, further comprising:

transmitting, by a communication device, the generated traffic light indication information to one or more of the navigation monitor of the vehicle, a HUD, the cluster, or an audio output device.

13. The vehicle traffic light information display method of claim 11, further comprising when the vehicle is stopped while the traffic light indication information is generated:

generating, by a notification information generator, vehicle departure notification information in response to a traffic light corresponding to the navigation guidance route being changed to a progress signal for the navigation guidance route; and transmitting, by the communication device, the vehicle departure notification information to one or more of the navigation monitor, a HUD, the cluster, or an audio output device of the vehicle.

14. The vehicle traffic light information display method of claim 10, further comprising:

transmitting, by the communication device, the generated portable device traffic light indication information to one or more of a HUD, the cluster, an audio output device, or the portable device; and transmitting, by the communication device, the generated traffic light indication information to the navigation monitor of the vehicle.

15. The vehicle traffic light information display method of claim 10, further comprising:

again determining, by the driving direction determiner, the driving direction when the driving direction does not match both the direction of the navigation guidance route and the direction of the portable device guidance route; and again recognizing, by the traffic light indication information generator, traffic lights around the vehicle when the driving direction does not match both the direction of the navigation guidance route and the direction of the portable device guidance route.

16. The vehicle traffic light information display method of claim 10, further comprising:

again determining, by the driving direction determiner, the driving direction when the vehicle is driving in a state in which the traffic light indication information or portable device traffic light indication information is generated; and again recognizing, by the traffic light indication information generator, traffic lights around the vehicle when the vehicle is driving in the state in which the traffic light indication information or portable device traffic light indication information is generated.

17. The vehicle traffic light information display method of claim 10, further comprising when the vehicle is stopped while the traffic light indication information is generated:

again generating, by the traffic light indication information generator, the traffic light indication information in response to a traffic light corresponding to the navigation guidance route being a stop signal for the navigation guidance route, or again generating, by the traffic light indication information generator, portable device traffic light indication information in response to a traffic light corresponding to a portable device guidance route being a stop signal for the portable device guidance route.

18. The vehicle traffic light information display method of claim 10, further comprising when the vehicle is stopped while the portable device traffic light indication information is generated:

generating, by a notification information generator, vehicle departure notification information in response to a traffic light corresponding to the portable device guidance route being changed to a progress signal for the portable device guidance route; and transmitting, by the communication device, the vehicle departure notification information to one or more of a HUD, the cluster, an audio output device, or the portable device.

* * * * *